United States Patent
Li et al.

(10) Patent No.: US 12,101,839 B2
(45) Date of Patent: Sep. 24, 2024

(54) INFORMATION PROCESSING METHOD AND RELATED NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yongjing Li, Beijing (CN); Dan Wang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 406 days.

(21) Appl. No.: 17/767,541

(22) PCT Filed: Sep. 10, 2020

(86) PCT No.: PCT/CN2020/114558
§ 371 (c)(1),
(2) Date: Apr. 8, 2022

(87) PCT Pub. No.: WO2021/068706
PCT Pub. Date: Apr. 15, 2021

(65) Prior Publication Data
US 2023/0239958 A1 Jul. 27, 2023

(30) Foreign Application Priority Data
Oct. 10, 2019 (CN) .......................... 201910959721.8

(51) Int. Cl.
*H04W 76/22* (2018.01)
*H04L 61/4511* (2022.01)
*H04W 8/26* (2009.01)

(52) U.S. Cl.
CPC ......... *H04W 76/22* (2018.02); *H04L 61/4511* (2022.05); *H04W 8/26* (2013.01)

(58) Field of Classification Search
None
See application file for complete search history.

(56) References Cited

U.S. PATENT DOCUMENTS

2014/0108672 A1* 4/2014 Ou .................... H04L 61/4511
709/238
2018/0192390 A1 7/2018 Li
(Continued)

FOREIGN PATENT DOCUMENTS

CN 102547861 A 7/2012
CN 102843740 A 12/2012
(Continued)

OTHER PUBLICATIONS

"3rd Generation Partnership Project; Technical Specification Group Services and System Aspects; System Architecture for the 5G System; Stage 2 (Release 16)", 3GPP TS 23.501 V16.1.0 (Jun. 2019). 7 parts.
(Continued)

Primary Examiner — Lonnie V Sweet
(74) Attorney, Agent, or Firm — Cooper Legal Group, LLC

(57) ABSTRACT

Disclosed are an information processing method and a related network device. The method comprises: a session management function (SMF) obtaining first address information of a local domain name system (DNS) server; sending the first address information to an uplink classifier;
(Continued)

and sending, by means of an access and mobility management function (AMF), the first address information to a user equipment (UE), wherein the first address information is used for the UE to update the IP address of local DNS server.

20 Claims, 5 Drawing Sheets

(56) References Cited

U.S. PATENT DOCUMENTS

| | | | |
|---|---|---|---|
| 2018/0192471 A1 | 7/2018 | Li | |
| 2019/0059067 A1* | 2/2019 | Lee | H04L 67/141 |
| 2019/0274185 A1* | 9/2019 | Stojanovski | H04L 47/2441 |
| 2020/0022069 A1* | 1/2020 | Salkintzis | H04W 48/14 |
| 2020/0128503 A1 | 4/2020 | Li | |
| 2020/0154390 A1* | 5/2020 | Kim | H04W 8/26 |
| 2021/0320897 A1* | 10/2021 | Stojanovski | H04W 4/50 |

FOREIGN PATENT DOCUMENTS

| | | |
|---|---|---|
| CN | 107517480 A | 12/2017 |
| CN | 108307521 A | 7/2018 |
| CN | 109729181 A | 5/2019 |
| CN | 109788078 A | 5/2019 |
| CN | 109831548 A | 5/2019 |
| CN | 109951880 A | 6/2019 |
| CN | 110048873 A | 7/2019 |
| CN | 110169089 A | 8/2019 |
| JP | 2004266568 A | 9/2004 |
| JP | 2022548649 A | 11/2022 |
| KR | 20190043079 A | 4/2019 |
| WO | 2018145654 A1 | 8/2018 |
| WO | 2018171859 A1 | 9/2018 |
| WO | 2019141169 A1 | 7/2019 |

OTHER PUBLICATIONS

"System Architecture for the 5G System (5GS)", Stage 2, Sep. 2019, 3GPP TS 23.501, V16.2.0, 3rd Generation Partnership Project; Technical Specification Group Services and System Aspects, (Release 16), 389 pgs.
"Study on Enhancing Topology of SMF and UPF in 5G Networks", Dec. 2018, 3GPP TR 23.726, V16.0.0, 3rd Generation Partnership Project; Technical Specification Group Services and System Aspects, (Release 16), 96 pgs.
International Search Report in the international application No. PCT/CN2020/114558, mailed on Dec. 9, 2020, 2 pgs.
English translation of the Written Opinion of the International Search Authority in the international application No. PCT/CN2020/114558, mailed on Dec. 9, 2020, 4 pgs.
"Study on Enhanced IMS to 5GC Integration", Mar. 2019, 3GPP TR 23.794, V1.0.0, Technical Report, 3rd Generation Partnership Project; Technical Specification Group Services and System Aspects; (Release 16), 83 pgs.
"System Architecture for the 5G System", Mar. 2019, 3GPP TS 23.501 V16.0.0, 3rd Generation Partnership Project; Technical Specification Group Services and System Aspects, Stage 2 (Release 16), 318 pgs.
"Solution for KI#1: Dns Inspector based EAS Discovery Solution", Jan. 2020, SA WG2 Meeting #136AH, S2-2000215, Incheon, South Korea, Source: Intel, 4 pgs.
"KI#1, Solution 22 updates with correcting option3", Oct. 2020, 3GPP TSG-SA WG2 Meeting #141E, S2-2006868, Electronic, Source: ChinaMobile, 10 pgs.
"KI#1, Sol#2: Update to Clarify the DNSRrequest Offload in Edge DN for ULCL, and Remove the EN1 and EN3", Jun. 2020, 3GPP SA WG2 Meeting #139e, Source: China Mobile, S2-2003780, e-meeting, 5 pgs.
"Pseudo-CR on Edge Application Server Discovery based on DNS", Sep. 2019, Source: Huawei, HiSilicon, 3GPP TSG-SA WG6 Meeting #33, S6-191886 (revision of S6-191725), Sophia Antipolis, France, 3 pgs.
"Interworking Between 5G Network and External Data Networks", Sep. 2019, 3GPP TS 29.561 V15.3.0, 3rd Generation Partnership Project; Technical Specification Group Core Network and Terminals; Stage 3 (Release 15), 49 pgs.
"Conclusion Update on UE IP Address Allocation in UPF", Nov. 2018, Source: Ericsson, 3GPP SA WG2 Meeting #129-BIS, S2-1811722 (revision of S2-18xxxxx), West Palm Beach, USA, 2 pgs.
Supplementary European Search Report in the European application No. 20873554.8, mailed on Sep. 23, 2022, 10 pgs.
"Solutions for Using Satellite Backhaul in Content Distribution Towards the Edge", Feb. 2018, Source: Airbus DS SLC, SES S.A. University of Surrey, 3GPP SA WG2 Meeting #131 S2-1902444. (revision of S2-1901546), Santa-Cruz, Tenerife, 4 pages.
"Correction on Notification Control for GBR QoS Flow", Feb. 2018, Source: Huawai, HiSilicon, 3GPP TSG-SA2 Meeting #126, S2-181568 (revision of S2-181193), Montreal, Canada, 4 pages.
First Office Action of the Canadian application No. 3154243, issued on Jun. 6, 2023. 6 pages.

* cited by examiner

INFORMATION PROCESSING METHOD AND RELATED NETWORK DEVICE

CROSS-REFERENCE TO RELATED APPLICATIONS

The application is filed based on and claims priority to Chinese Patent Application No. 201910959721.8 filed on Oct. 10, 2019, the entire contents of which are incorporated herein by reference.

TECHNICAL FIELD

The disclosure relates to a wireless communication technology, and in particular to an information processing method and a related network device.

BACKGROUND

In a fifth generation (5G) core network, a Use Plane Function (UPF) may be used as an Uplink classifier (UL CL) and inserted in the data path of a Protocol Data Unit (PDU) session by a Session Management Function (SMF) for local traffic routing. After the UL CL is inserted, the UL CL connects two or more different UPFs to be used as PDU Session Anchors (PSAs), each of which may be connected to a different Data Network (DN).

In addition, a 5G network has a great capability of Multi-access Edge Computing (MEC), which may be supported by the UL CL to achieve a capability of local traffic routing. When a User Equipment (UE) accesses an application before the MEC occurs, a data stream needs to enter a Public Data Network (PDN) through the UPF. When an MEC node is deployed, the application may be deployed on a local MEC node, and a data stream of a user accessing the application may be distributed to a local position through a traffic routing function of the UL CL, thereby reducing burden of the core network.

However, in the UL CL-based local traffic routing scenario, a Domain Name System (DNS) cache in the UE is not updated, causing the UE to be unable to access locally deployed applications.

SUMMARY

Embodiments of the disclosure are intended to provide an information processing method and a related network device.

Technical solutions of the embodiments of the disclosure are implemented as follows.

According to a first aspect, an embodiment of the disclosure provides an information processing method, including the following operations.

An SMF obtains first address information of a local DNS server.

The first address information is configured to an uplink classifier, and the first address information is configured to a UE through an access and mobility management function (AMF).

Here, the first address information is used for the UE to refresh an IP address of the local DNS server.

In some optional embodiments of the disclosure, the method may further include the following operations before the SMF obtains the first address information of the local DNS server.

The SMF receives a notification message sent by the AMF. The notification message is used for indicating that the UE has moved to a service coverage of a first PDU session anchor connected to an MEC server.

The SMF sends a session modification request to the uplink classifier. The session modification request is used for indicating inserting the uplink classifier into a session link.

In some optional embodiments of the disclosure, the method may further include the following operations. The SMF configures a traffic routing rule to the uplink classifier, the traffic routing rule configures the uplink classifier to route, through a first PDU session anchor, first data of the UE corresponding to a DNS query to the local DNS server.

In some optional embodiments of the disclosure, the operation that the SMF configures the first address information and the traffic routing rule to the uplink classifier may further include the following operations. The SMF sends a session modification request including the first address information and the traffic routing rule to the uplink classifier.

In some optional embodiments of the disclosure, the operation of configuring, through the AMF, the first address information to the UE may further include the following operations.

The SMF sends an update session management context response to the AMF, the Update session management context response includes the first address information, and is provided by the AMF to the UE through non-access stratum (NAS) message.

According to a second aspect, an embodiment of the disclosure further provides an information processing method, including the following operations.

An uplink classifier receives first address information of a local DNS server and a traffic routing rule sent by an SMF.

First data corresponding to a local position sent by a UE is received, and the first data is sent, according to the traffic routing rule, to a first PDU session anchor connected to an MEC server, the first data is forwarded by the first PDU session anchor to the local DNS server.

In some optional embodiments of the disclosure, the method may further include the following operations. The uplink classifier obtains, through the first PDU session anchor, second address information of the MEC server sent by the local DNS server.

The second address information is sent to the UE.

In some optional embodiments of the disclosure, the method may further include the following operations. The uplink classifier receives second data corresponding to the local position sent by the UE, the second data includes the second address information.

The second data is sent to the MEC server through the first PDU session anchor.

In some optional embodiments of the disclosure, the receiving, by the uplink classifier, the first address information of the local DNS server and the traffic routing rule sent by the SMF may further include the following operations. The uplink classifier receives a session modification request sent by the SMF and including the first address information and the traffic routing rule.

According to a third aspect, an embodiment of the disclosure further provides an SMF, including an acquisition unit and a first sending unit.

The acquisition unit is configured to obtain first address information of a local DNS server.

The first sending unit is configured to configure the first address information to an uplink classifier, and configure, through an AMF, the first address information to a UE, here the first address information is used for the UE to refresh an IP address of the local DNS server.

In some optional embodiments of the disclosure, the SMF further includes a first reception unit configured to receive a notification message sent by the AMF before the acquisition unit obtains the first address information of the local DNS server. The notification message is used for indicating that the UE has moved to a service coverage of a first PDU session anchor connected to an MEC server.

The first sending unit is further configured to send a session modification indication message to the uplink classifier. The session modification indication message is used for indicating inserting the uplink classifier into a session link.

In some optional embodiments of the disclosure, the first sending unit is further configured to send a traffic routing rule to the uplink classifier, the traffic routing rule is used for configuring the uplink classifier to route, through a first PDU session anchor, first data of the UE corresponding to a DNS query to the local DNS server.

In some optional embodiments of the disclosure, the first sending unit is configured to send a session modification request including the first address information and the traffic routing rule to the uplink classifier.

In some optional embodiments of the disclosure, the first sending unit is configured to send an update session management context response to the AMF, the Update session management context response includes the first address information, and the first address information is sent by the AMF to the UE through an NAS message.

According to a fourth aspect, an embodiment of the disclosure further provides an uplink classifier, including a second reception unit and a second sending unit.

The second reception unit is configured to receive first address information of a local DNS server and a traffic routing rule sent by an SMF, and is further configured to receive first data corresponding to a local position sent by a UE.

The second sending unit is configured to send, according to the traffic routing rule, the first data to a first PDU session anchor connected to an MEC server, the first data is forwarded by the first PDU session anchor to the local DNS server.

In some optional embodiments of the disclosure, the second reception unit is further configured to obtain, through the first PDU session anchor, second address information of the MEC server sent by the local DNS server.

The second sending unit is further configured to send the second address information to the UE.

In some optional embodiments of the disclosure, the second reception unit is further configured to receive second data corresponding to the local position sent by the UE, the second data includes the second address information.

The second sending unit is further configured to send, through the first PDU session anchor, the second data to the MEC server.

In some optional embodiments of the disclosure, the second reception unit is configured to receive a session modification request sent by the SMF. The session modification request includes the first address information and the traffic routing rule.

According to a fifth aspect, an embodiment of the disclosure further provides a computer-readable storage medium, having stored thereon a computer program which is configured to, when executed by a processor, implement operations of the method of the first aspect of embodiments of the disclosure; or, a computer program which is configured to, when executed by a processor, implement operations of the method of the second aspect of embodiments of the disclosure.

According to a sixth aspect, an embodiment of the disclosure further provides a network device, including a memory, a processor, and a computer program stored in the memory and executable on the processor, the processor is configured to, when executing the program, implement operations of the method of the first aspect of embodiments of the disclosure; or, the processor is configured to, when executing the program, implement operations of the method of the second aspect of embodiments of the disclosure.

Embodiments of the disclosure provide an information processing method and a related network device, the method may include the following operations. An SMF obtains first address information of a local DNS server. The first address information is configured to an uplink classifier, and the first address information is configured to a UE through an AMF. Here, the first address information is used for the UE to refresh an Internet Protocol (IP) address of the local DNS server. According to the technical solutions of the embodiments of the disclosure, in the UL CL-based local traffic routing scenario, the DNS cache in the UE can be updated, so that application data of the UE is directed to the local position and processed by the local MEC server, thereby implementing local traffic routing.

DETAILED DESCRIPTION

The disclosure will be described in further detail below with reference to the accompanying drawings and specific embodiments.

Figure 1:
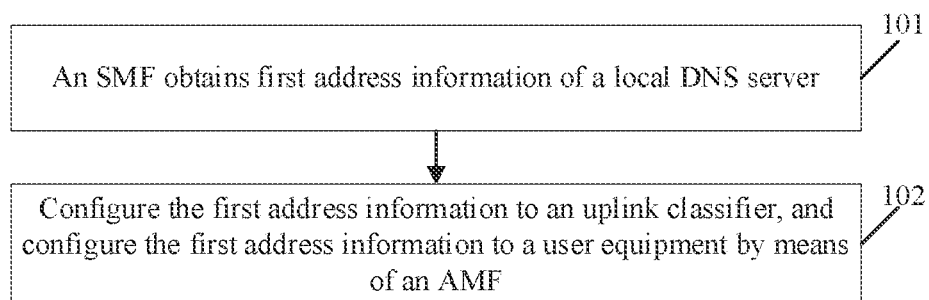
FIG. 1 is a first schematic flowchart of an information processing method according to an embodiment of the disclosure.

Embodiments of the disclosure provide an information processing method. FIG. 1 is a first schematic flowchart of an information processing method according to an embodiment of the disclosure. As shown in FIG. 1, the method may include the following operations.

In operation 101, an SMF obtains first address information of a local DNS server.

In operation 102, the first address information is configured to an uplink classifier, and the first address information is configured to a UE through an AMF, here the first address information is used for the UE to refresh an Internet Protocol (IP) address of the local DNS server.

In the embodiment, the SMF configures the first address information to the UE through the AMF, so that the UE may update a DNS cache. Here the first address information may be an IP address of the local DNS server. The DNS cache of the UE may store an IP address of a DNS obtained previously by the UE, then the UE updates the DNS cache, deletes the IP address of the DNS in the DNS cache, and stores the first address information.

The information processing solution of the embodiment is executed on the premise that the UE moves to a service coverage of a first PDU session anchor connected to an MEC server (that is, the UE moves to a local position), a PDU session of the UE has been established, and the uplink classifier has been inserted into a PDU session link. In an actual application, a system architecture to which the information processing method of the embodiment is applied further includes a second anchor; the uplink classifier is connected to the first PDU session anchor and the second PDU session anchor respectively; the first PDU session anchor is connected to the MEC server and the local DNS server respectively, and the second anchor may be connected to a public network through a Packet Data Network (PDN), and the public network and the MEC server may deploy applications respectively. Here both the first PDU session anchor and the second anchor may be PSAs.

Based on this, in an optional embodiment of the disclosure, the method may further include the following operations before the SMF obtains the first address information of the local DNS server. The SMF receives a notification message sent by the AMF. The notification message is used for indicating that the UE has moved to a service coverage of a first PDU session anchor connected to an MEC server. The SMF sends a session modification indication message to the uplink classifier. The session modification indication message is used for indicating inserting the uplink classifier into a session link.

In an optional embodiment of the disclosure, the method may further include the following operations. The SMF sends a traffic routing rule to the uplink classifier, the traffic routing rule is used for configuring the uplink classifier to route, through a first PDU session anchor, first data of the UE corresponding to a local position to the local DNS server.

In the embodiment, the first data of the UE corresponding to the local position is data sent by the UE within the service coverage of the first PDU session anchor connected to the MEC server. The first data is sent to the local DNS server through the first PDU session anchor, a domain name is parsed by the local DNS server, and it is determined by the parsed domain name whether the application which the first data requests to access is in local (that is, it is determined whether the application which the first data requests to access is deployed in the MEC server).

In an optional embodiment of the disclosure, the operation that the SMF sends the first address information and the traffic routing rule to the uplink classifier may further include the following operations. The SMF sends a session modification request including the first address information and the traffic routing rule to the uplink classifier.

In an optional embodiment of the disclosure, the operation of configuring, through the AMF, the first address information to the UE may further include the following operations. The SMF sends an update session management context response to the AMF, the update session management context response includes the first address information, and the first address information is sent by the AMF to the UE through an NAS message.

According to the technical solution of the embodiment of the disclosure, in the UL CL-based local traffic routing scenario, the DNS cache in the UE can be updated, so that application data of the UE is directed to the local position and processed by the local MEC server, thereby implementing local traffic routing.

Figure 2:
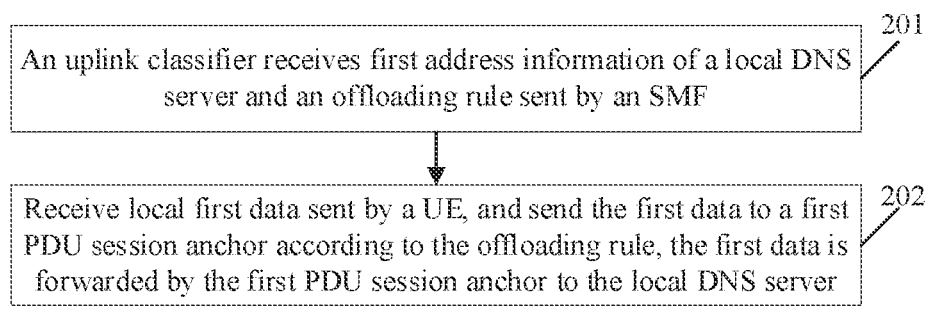
FIG. 2 is a second schematic flowchart of an information processing method according to an embodiment of the disclosure.

Based on the foregoing embodiment, embodiments of the disclosure further provide an information processing method. FIG. 2 is a second schematic flowchart of an information processing method according to an embodiment of the disclosure. As shown in FIG. 2, the method may include the following operations.

In operation 201, an uplink classifier receives first address information of a local DNS server and a traffic routing rule sent by an SMF.

In operation 202, first data corresponding to a local position sent by a UE is received, and the first data is sent, according to the traffic routing rule, to a first PDU session anchor connected to an MEC server, the first data is forwarded by the first PDU session anchor to the local DNS server.

In the embodiment, the uplink classifier sends the first data corresponding to the local position sent by the UE to the first PDU session anchor, the first data is sent by the first PDU session anchor to the local DNS server, the local DNS server parses a domain name, and determines whether the application which the first data requests to access is in local through the parsed domain name, that is, the local DNS server determines whether the application which the first data requests to access is deployed in the MEC server.

In an optional embodiment of the disclosure, the method may further include the following operations. The uplink classifier obtains, through the first PDU session anchor, second address information of the MEC server sent by the local DNS server. The second address information is sent to the UE.

In the embodiment, when the local DNS server determines that the application which the first data requests to access is deployed in the MEC server, the local DNS server sends an IP address (i.e., the second address information) of the MEC server to the first PDU session anchor, and the first PDU session anchor sends the IP address (i.e., the second address information) of the MEC server to the uplink classifier. The uplink classifier sends the IP address (i.e., the second address information) of the MEC server to the UE.

In an optional embodiment of the disclosure, the method may further include the following operations. The uplink classifier receives second data corresponding to the local position sent by the UE, the second data includes the second address information. The second data is sent to the MEC server through the first PDU session anchor.

In an optional embodiment of the disclosure, the operation that the uplink classifier receives the first address information of the local DNS server and the traffic routing rule sent by the SMF may further include the following operations. The uplink classifier receives a session modification request sent by the SMF. The session modification request includes the first address information and the traffic routing rule.

According to the technical solution of the embodiment of the disclosure, in the UL CL-based local traffic routing scenario, the DNS cache in the UE can be updated, so that application data of the UE is directed to the local position and processed by the local MEC server, thereby implementing local traffic routing.

Figure 3:
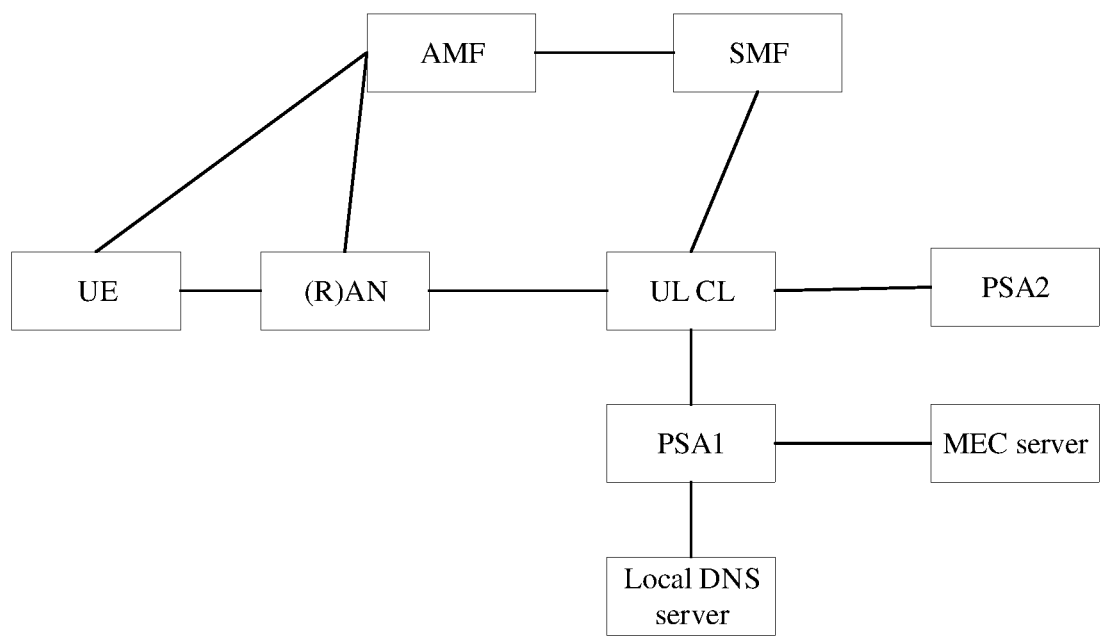
FIG. 3 is a schematic diagram of an application architecture of an information processing method according to an embodiment of the disclosure.

FIG. 3 is a schematic diagram of an application architecture of an information processing method according to an embodiment of the disclosure. As shown in FIG. 3, a system architecture to which the information processing method according to the embodiment of the disclosure is applied may include a UE, a (Radio) Access Network ((R)AN), an AMF, an SMF, a UL CL, a PSA1, a PSA2, a local DNS server, and an MEC server. Here the UL CL is connected to the PSA1 and the PSA2 respectively; the PSA1 is connected to the MEC server and the local DNS server respectively, and the PSA2 may be connected to a public network through a PDN, and the public network and the MEC server may deploy applications respectively.

Figure 4:
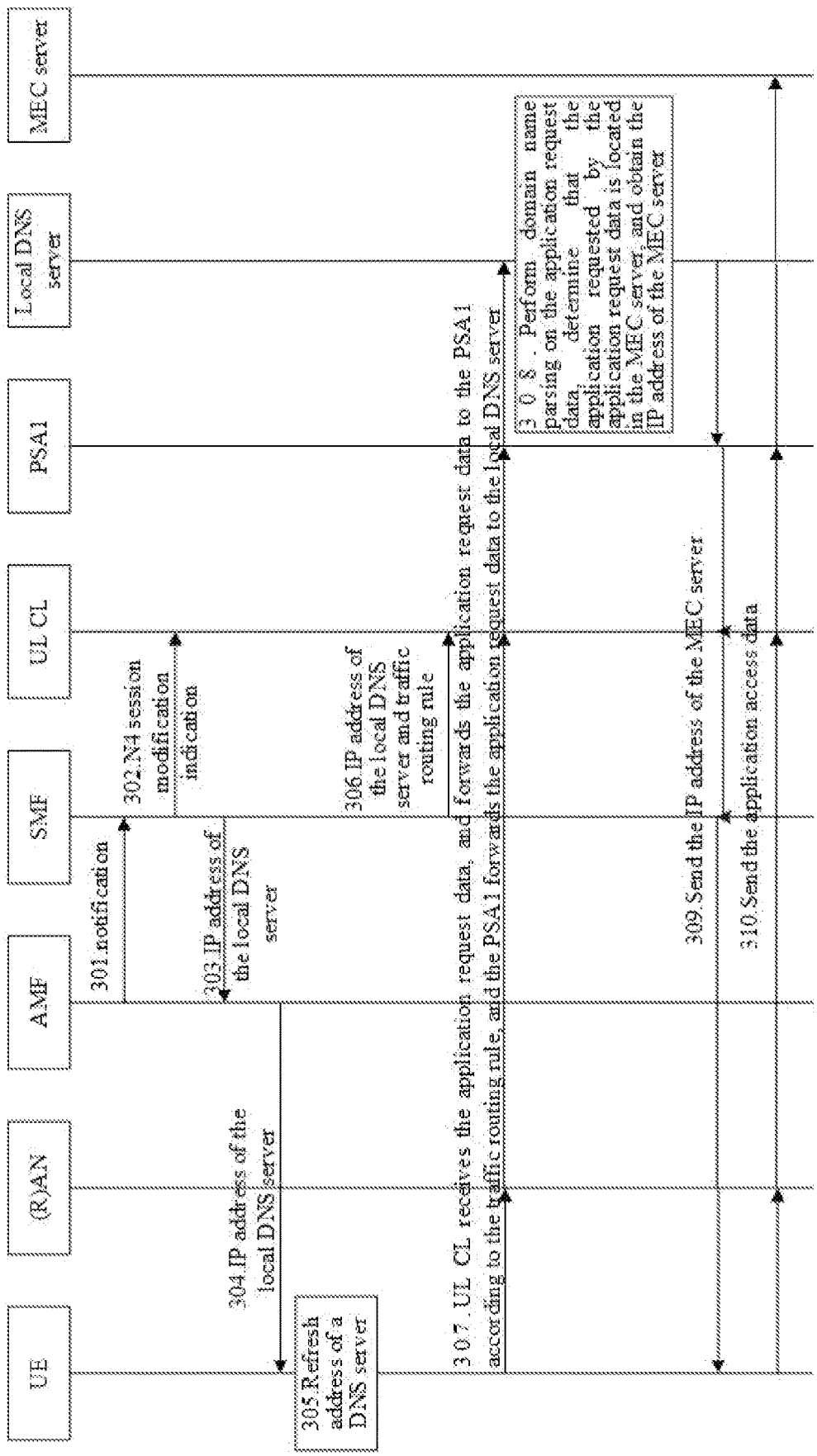
FIG. 4 is a third schematic flowchart of an information processing method according to an embodiment of the disclosure.

Based on the application architecture shown in FIG. 3, an embodiment of the disclosure further provides an information processing method. In the embodiment, it is assumed that the UE moves to a service coverage of the PSA1 connected to the MEC server, a PDU session of the UE has been established, and the uplink classifier has been inserted into a PDU session link. FIG. 4 is a third schematic flowchart of an information processing method according to an embodiment of the disclosure. As shown in FIG. 4, the method may include the following operations.

In operation 301, the AMF sends a notification message to the SMF. Here, the notification message is used for indicating that the UE has moved to a service coverage of the PSA1 connected to the MEC server.

Here, the notification message may specifically be an N1 Message Notify in a Namf_Communication service.

In operation 302, the SMF initiates an N4 session modification indication message for indicating inserting the UL CL into a session link.

In operation 303, the SMF searches and obtains an IP address of the local DNS server, and sends the IP address of the local DNS server to the AMF.

In the embodiment, it is assumed that the SMF knows the IP address of the local DNS server in advance. In an embodiment, the SMF may obtain and store IP addresses of multiple DNS servers in advance, and the multiple DNS servers may be distributed in various zones. The local DNS server in the embodiment may be one of the multiple DNS servers.

Here, the SMF sends an update session management context response to the AMF. The update session management context response may include the IP address of the local DNS server. Specifically, the update session management context response may be an Nsmf_PDUSession_UpdateSMContext Response.

In operation 304, the AMF sends the IP address of the local DNS server to the UE.

Here, the AMF sends an NAS message to the UE. Here, the NAS message includes the IP address of the local DNS server. Specifically, the NAS message may be a N1 NAS message.

In operation 305, the UE updates an address of a DNS server as the IP address of the local DNS server.

In operation 306, the SMF sends the IP address of the local DNS server and a traffic routing rule to the UL CL. The traffic routing rule is used for configuring the UL CL to route, through the PSA1, data of the UE corresponding to a local position to the local DNS server.

Here, the SMF may send an N4 session modification request to the UL CL. Here, the session modification request includes the IP address of the local DNS server and the traffic routing rule.

In operation 307, when the UE sends application request data, the UL CL receives the application request data, and forwards the application request data to the PSA1 according to the traffic routing rule, and the PSA1 forwards the application request data to the local DNS server.

In operation 308, the local DNS server performs domain name parsing on the application request data, determines that the application requested by the application request data is located in the MEC server, and obtains the IP address of the MEC server.

In operation 309, the local DNS server sends the IP address of the MEC server to the PSA1, the PSA1 sends the IP address of the MEC server to the UL CL, and the UL CL sends the IP address of the MEC server to the UE.

In operation 310, the UE sends the application access data according to the IP address of the MEC server, the UL CL receives the application access data and sends the application access data to the PSA1, and the PSA1 forwards the application request data to the MEC server for processing.

In the embodiment, data between the UE and the UL CL may be forwarded through the (R)AN.

In the embodiment, execution sequences of operations 303 and 306 may not be limited to that shown in the embodiment, operation 306 may be performed first, and then operations 303 to 305 may be performed; of course, operations 303 and 306 may also be performed at the same time, which is not limited in the embodiment.

Figure 5:
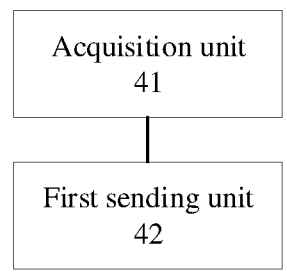
FIG. 5 is a schematic structural diagram of a composition of an SMF according to an embodiment of the disclosure.

Embodiments of the disclosure also provide an SMF. FIG. 5 is a schematic structural diagram of a composition of an SMF according to an embodiment of the disclosure. As shown in FIG. 5, the SMF includes an acquisition unit 41 and a first sending unit 42.

The acquisition unit 41 is configured to obtain first address information of a local DNS server.

The first sending unit 42 is configured to configure the first address information to an uplink classifier, and configure, through an AMF, the first address information to a UE. Here, the first address information is used for the UE to refresh an Internet Protocol (IP) address of the local DNS server.

Figure 6:
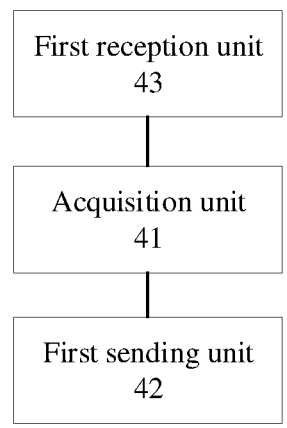
FIG. 6 is a schematic structural diagram of another composition of an SMF according to an embodiment of the disclosure.

In an optional embodiment of the disclosure, as shown in FIG. 6, the SMF further includes a first reception unit 43 configured to receive a notification message sent by the AMF before the acquisition unit 41 obtains the first address information of the local DNS server. The notification message is used for indicating that the UE has moved to a service coverage of a first PDU session anchor connected to an MEC server.

The first sending unit 42 is further configured to send a session modification indication message to the uplink classifier, the session modification indication message is used for indicating inserting the uplink classifier into a session link.

In an optional embodiment of the disclosure, the first sending unit 42 is further configured to send a traffic routing rule to the uplink classifier, the traffic routing rule is used for configuring the uplink classifier to route, through a first PDU session anchor, first data of the UE corresponding to a local position to the local DNS server.

In an optional embodiment of the disclosure, the first sending unit 42 is configured to send a session modification request including the first address information and the traffic routing rule to the uplink classifier.

In an optional embodiment of the disclosure, the first sending unit 42 is configured to send an update session management context response to the AMF, the update session management context response includes the first address information, and the first address information is sent by the AMF to the UE through an NAS message.

In the embodiment of the disclosure, in a practical application, the acquisition unit 41 in the SMF may be implemented by a Central Processing Unit (CPU), a Digital Signal Processor (DSP), a Microcontroller Unit (MCU) or a Field-Programmable Gate Array (FPGA) in the SMF; and in a practical application, the first sending unit 42 and the first reception unit 43 in the SMF may be implemented by a communication modular assembly (including a basic communication kit, an operating system, a communication module, a standardized interface, a protocol, or the like) and a transceiver antenna.

It should be noted that when the SMF provided by the above embodiment performs information processing, division of the above program modules is used only as an example for description. In a practical application, the above processing may be allocated to be completed by different program modules according to needs, that is, an internal structure of the SMF is divided into different program modules to complete all or part of the above processing. Furthermore, the SMF provided by the above embodiment belongs to the same concept as the embodiment of the information processing method, a specific implementation thereof may refer to the method embodiment in detail, and will not be elaborated again here.

Figure 7:
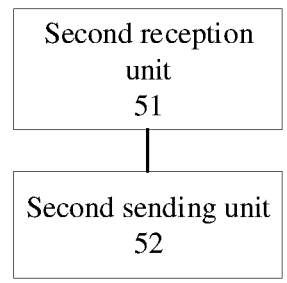
FIG. 7 is a schematic structural diagram of a composition of an uplink classifier according to an embodiment of the disclosure.

Embodiments of the disclosure also provide an uplink classifier. FIG. 7 is a schematic structural diagram of a composition of an uplink classifier according to an embodiment of the disclosure. As shown in FIG. 7, the uplink classifier includes a second reception unit 51 and a second sending unit 52.

The second reception unit 51 is configured to receive first address information of a local DNS server and a traffic routing rule sent by an SMF, and is further configured to receive first data corresponding to a local position sent by a UE.

The second sending unit 52 is configured to send, according to the traffic routing rule, the first data to a first PDU session anchor connected to an MEC server, the first data is forwarded by the first PDU session anchor to the local DNS server.

In an optional embodiment of the disclosure, the second reception unit 51 is further configured to obtain, through the first PDU session anchor, second address information of the MEC server sent by the local DNS server.

The second sending unit 52 is further configured to send the second address information to the UE.

In an optional embodiment of the disclosure, the second reception unit 51 is further configured to receive second data corresponding to the local position sent by the UE. The second data includes the second address information.

The second sending unit 52 is further configured to send, through the first PDU session anchor, the second data to the MEC server.

In an optional embodiment of the disclosure, the second reception unit 51 is configured to receive a session modification request sent by the SMF. The session modification request includes the first address information and the traffic routing rule.

In the embodiment of the disclosure, in a practical application, the second sending unit 52 and the second reception unit 51 in the uplink classifier may be implemented by a communication modular assembly (including a basic communication kit, an operating system, a communication module, a standardized interface, a protocol, or the like) and a transceiver antenna.

It should be noted that the uplink classifier according to the above embodiment performs information processing, division of the above program modules is used only as an example for description. In a practical application, the above processing may be allocated to be completed by different program modules according to needs, that is, an internal structure of the uplink classifier is divided into different program modules to complete all or part of the above processing. Furthermore, the uplink classifier provided by the above embodiment belongs to the same concept as the embodiment of the information processing method, a specific implementation thereof may refer to the method embodiment in detail, and will not be elaborated again here.

Figure 8:
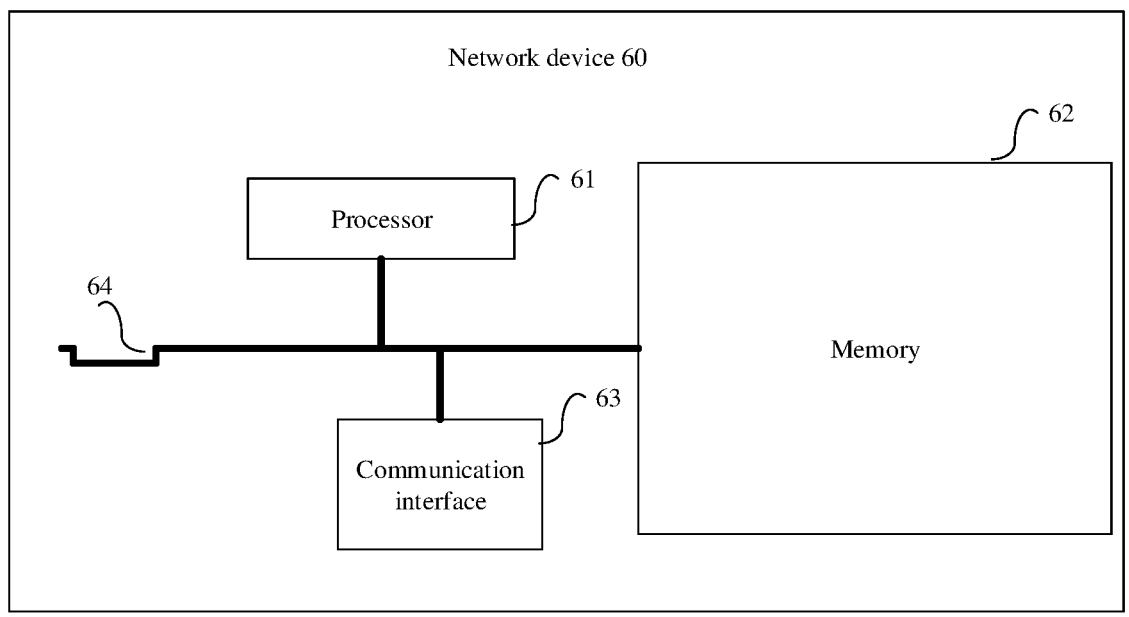
FIG. 8 is a schematic structural diagram of a hardware composition of a network device according to an embodiment of the disclosure.

Embodiments of the disclosure further provide a network device. FIG. 8 is a schematic structural diagram of a hardware composition of a network device according to an embodiment of the disclosure. As shown in FIG. 8, the network device 60 includes a memory 62, a processor 61, and a computer program stored in the memory 62 and operable on the processor 61. The processor 61 implements operations of an information processing method applied to an SMF or an uplink classifier according to the embodiment of the disclosure, when executing the program.

As will be appreciated, the network device 60 also includes a communication interface 63. Various components in the network device 60 may be coupled together by a bus system 64. It may be appreciated that the bus system 64 implements connection and communication among these components. The bus system 64 includes, in addition to a data bus, a power bus, a control bus, and a status signal bus. However, for clarity of explanation, various buses are labeled as the bus system 64 in FIG. 8.

It may be appreciated that the memory 62 may be a volatile memory or a non-volatile memory, or may include both volatile and non-volatile memories. Here the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, an optical disk, or a Compact Disc Read-Only Memory (CD-ROM); the magnetic surface memory may be a magnetic disk memory or a magnetic tape memory. The volatile memory may be a Random Access Memory (RAM), which serves as an external cache. By way of exemplary but not limiting descriptions, many forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM). The memory 62 described in the embodiment of the disclosure is intended to include, but is not limited to, these and any other suitable types of memories.

The methods disclosed in the above embodiments of the disclosure may be applied to the processor 61, or may be implemented by the processor 61. The processor 61 may be an integrated circuit chip having signal processing capability. In an implementation process, the operations of the above methods may be performed by an integrated logic circuit of hardware in the processor 61 or instructions in the form of software. The processor 61 may be a general purpose processor, a DSP, or another programmable logic device, a discrete gate or a transistor logic device, a discrete hardware component, or the like. The processor 61 may implement or perform the methods, steps and logic block diagrams disclosed in the embodiments of the disclosure. The general purpose processor may be a microprocessor, or any conventional processor, or the like. The operations of the methods disclosed in the embodiments of the disclosure may be directly embodied as being performed by a hardware decoding processor, or may be performed by a combination of hardware and software modules in the decoding processor. The software module may be located in a storage medium located in the memory 62, and the processor 61 reads information in the memory 62 and performs the operations of the foregoing methods in combination with its hardware.

In an exemplary embodiment, the network device may be implemented by one or more Application Specific Integrated Circuits (ASICs), DSPs, Programmable Logic Devices (DSPs), Complex Programmable Logic Devices (CPLDs), FPGAs, general purpose processors, controllers, MCUs, Microprocessors, or other electronic components to perform the foregoing methods.

Embodiments of the disclosure also provide a computer-readable storage medium, having stored thereon a computer program which, when executed by a processor, implements operations of an information processing method applied to an SMF or an uplink classifier according to the embodiment of the disclosure.

The methods disclosed in several method embodiments provided by the disclosure may be combined arbitrarily without conflict, to obtain new method embodiments.

The features disclosed in several product embodiments provided by the disclosure may be combined arbitrarily without conflict, to obtain new product embodiments.

The features disclosed in several method or devices embodiments provided by the disclosure may be combined arbitrarily without conflict, to obtain new method embodiments or device embodiments.

In several embodiments provided by the disclosure, it should be appreciated that the disclosed devices and methods may be implemented in other ways. The above device embodiments are merely illustrative, for example, division of the units is only a logical function division, another division may be made in a practice implementation, for example, multiple units or components may be combined or may be integrated into another system, or some features may be ignored or may not be performed. Furthermore, the components shown or discussed may be coupled, or directly coupled, or communicatively connected to each other through some interfaces, indirect coupling or communicatively connection of devices or units may be electrical, mechanical or other ways.

The units described as separate parts may be or may not be physically separate, and the parts displayed as units may be or may not be physical units, that is, may be located in one place, or may be distributed to multiple network units; part or all of the units may be selected according to actual needs to achieve the purpose of solutions of the embodiments.

Furthermore, all the functional units in the embodiments of the disclosure may be integrated into one processing unit, or each unit may be used as one unit individually, or two or more units may be integrated into one unit; the integrated unit may be implemented in the form of hardware or in the form of hardware and software functional units.

It may be understood by a person of ordinary skill in the art that all or part of operations implementing the above method embodiments may be implemented by a program instruction related hardware. The above program may be stored in a computer-readable storage medium, and execute the operations of the above method embodiments when it is executed. The aforementioned storage medium includes various media capable of storing program codes, such as a mobile storage device, a ROM, a RAM, a magnetic disk, an optical disk, or the like.

Or, the above integrated unit of the disclosure may also be stored in a computer-readable storage medium when it is implemented in the form of software function module and sold or used as an independent product. Based on such an understanding, the technical solutions of the embodiments of the disclosure substantially or parts making contributions to the related art may be embodied in the form of software product, and the computer software product is stored in a storage medium, including multiple instructions configured to enable a piece of computer equipment (which may be a personal computer, a server, a network device, or the like) to execute all or part of the method in each embodiment of the disclosure. The forgoing storage medium includes various media capable of storing program codes, such as a mobile storage device, a ROM, a RAM, a magnetic disk, an optical disk, or the like.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be defined by the scope of protection of the appended claims.

The invention claimed is:

1. An information processing method, comprising:
   obtaining, by a session management function (SMF), first address information of a local domain name system (DNS) server; and
   configuring the first address information to an uplink classifier, and configuring, through an access and mobility management function (AMF), the first address information to a user equipment (UE);
   wherein the first address information is used for the UE to refresh an Internet Protocol (IP) address of the local DNS server.

2. The method of claim 1, wherein before obtaining, by the SMF, the first address information of the local DNS server, the method further comprises:
   receiving, by the SMF, a notification message sent by the AMF, wherein the notification message is used for indicating that the UE has moved to a service coverage of a first protocol data unit (PDU) session anchor connected to a multi-access edge computing (MEC) server; and
   sending, by the SMF, a session modification indication message to the uplink classifier, wherein the session modification indication message is used for indicating inserting the uplink classifier into a session link.

3. The method of claim 1, further comprising:
   sending, by the SMF, a traffic routing rule to the uplink classifier, wherein the traffic routing rule is used for configuring the uplink classifier to route, through a first protocol data unit (PDU) session anchor, first data of the UE corresponding to a local position to the local DNS server.

4. The method of claim 3, wherein the sending, by the SMF, the first address information and the traffic routing rule to the uplink classifier comprises:
sending, by the SMF, a session modification request comprising the first address information and the traffic routing rule to the uplink classifier.

5. The method of claim 1, wherein the configuring, through the AMF, the first address information to the UE comprises:
sending, by the SMF, an update session management context response to the AMF, wherein the update session management context response comprises the first address information, and the first address information is sent by the AMF to the UE through a non-access stratum (NAS) message.

6. A non-transitory computer-readable storage medium, having stored thereon a computer program configured to, when executed by a processor, implement steps of the method of claim 1.

7. An information processing method, comprising:
receiving, by an uplink classifier, first address information of a local domain name system (DNS) server and a traffic routing rule sent by a session management function (SMF); and
receiving first data corresponding to a local position sent by a user equipment (UE), and sending, according to the traffic routing rule, the first data to a first protocol data unit (PDU) session anchor connected to a multi-access edge computing (MEC) server, wherein the first data is forwarded by the first PDU session anchor to the local DNS server.

8. The method of claim 7, further comprising:
obtaining, by the uplink classifier through the first PDU session anchor, second address information of the MEC server sent by the local DNS server; and
sending the second address information to the UE.

9. The method of claim 8, further comprising:
receiving, by the uplink classifier, second data corresponding to the local position sent by the UE, the second data comprising the second address information; and
sending, through the first PDU session anchor, the second data to the MEC server.

10. The method of claim 7, wherein the receiving, by the uplink classifier, the first address information of the local DNS server and the traffic routing rule sent by the SMF comprises:
receiving, by the uplink classifier, a session modification message sent by the SMF, wherein the session modification message comprises the first address information and the traffic routing rule.

11. A network device, comprising a memory, a processor, and a computer program stored in the memory and executable by the processor, the processor is configured to, when executing the computer program, implement steps of the method of claim 6.

12. The network device of claim 11, wherein the processor is further configured to:
obtain, through the first PDU session anchor, second address information of the MEC server sent by the local DNS server; and
send the second address information to the UE.

13. The network device of claim 12, wherein the processor is further configured to:
receive second data corresponding to the local position sent by the UE, the second data comprising the second address information; and
send, through the first PDU session anchor, the second data to the MEC server.

14. The network device of claim 11, wherein the processor is configured to receive a session modification message sent by the SMF, wherein the session modification message comprises the first address information and the traffic routing rule.

15. A non-transitory computer-readable storage medium, having stored thereon a computer program configured to, when executed by a processor, implement steps of the method of claim 7.

16. A network device, comprising a memory, a processor, and a computer program stored in the memory and executable by the processor, the processor is configured to, when executing the computer program:
obtain first address information of a local domain name system (DNS) server; and
configure the first address information to an uplink classifier, and configure, through an access and mobility management function (AMF), the first address information to a user equipment (UE);
wherein the first address information is used for the UE to refresh an Internet Protocol (IP) address of the local DNS server.

17. The network device of claim 16, wherein before obtaining the first address information of the local DNS server, the processor is further configured to:
receive a notification message sent by the AMF, wherein the notification message is used for indicating that the UE has moved to a service coverage of a first PDU session anchor connected to a multi-access edge computing (MEC) server; and
send a session modification indication message to the uplink classifier, wherein the session modification indication message is used for indicating inserting the uplink classifier into a session link.

18. The network device of claim 16, wherein the processor is further configured to send a traffic routing rule to the uplink classifier, wherein the traffic routing rule is used for configuring the uplink classifier to route, through a first PDU session anchor, first data of the UE corresponding to a local position to the local DNS server.

19. The network device of claim 18, wherein the processor is configured to send a session modification message comprising the first address information and the traffic routing rule to the uplink classifier.

20. The network device of claim 16, wherein the processor is configured to:
send an update session management context response to the AMF, wherein the update session management context response comprises the first address information, and the first address information is sent by the AMF to the UE through a non-access stratum (NAS) message.

* * * * *